United States Patent [19]
Ferris

[11] Patent Number: 5,132,011
[45] Date of Patent: Jul. 21, 1992

[54] OIL, WATER AND GAS MIXTURE SEPARATOR

[75] Inventor: John W. Ferris, Elmore City, Okla.

[73] Assignee: Petroleum Equipment Specialties, Inc., Oklahoma City, Okla.

[21] Appl. No.: 739,482

[22] Filed: Aug. 2, 1991

[51] Int. Cl.[5] ........................ C02F 1/40; B01D 17/032
[52] U.S. Cl. .................... 210/180; 210/187; 210/519; 210/521; 210/537; 210/539; 55/175; 55/176
[58] Field of Search .............. 210/180, 187, 519, 521, 210/533, 537, 539, 540; 55/174, 175, 176

[56] References Cited

U.S. PATENT DOCUMENTS

| | | | |
|---|---|---|---|
| 1,112,077 | 9/1914 | McLean | 210/533 |
| 1,260,947 | 3/1918 | Sperry et al. | 210/533 |
| 2,601,903 | 7/1952 | Erwin | 210/187 |
| 2,783,854 | 3/1957 | Lovelady et al. | 210/180 |
| 2,825,422 | 3/1958 | Schoenfeld | 210/187 |
| 2,903,015 | 9/1959 | Erwin | 210/533 |
| 3,318,448 | 5/1967 | Fryer | 210/187 |
| 3,394,530 | 7/1968 | O'Neill et al. | 210/539 |
| 4,073,734 | 2/1978 | Lowrie | 210/532.1 |
| 4,233,154 | 11/1980 | Presley | 210/800 |

Primary Examiner—Stanley S. Silverman
Assistant Examiner—Christopher Upton
Attorney, Agent, or Firm—Laney, Dougherty, Hessin & Beavers

[57] ABSTRACT

A treater apparatus for separating mixed oil, water and gas into these components and including an elongated tank having a first end and an opposite, second end. A horizontally extending partition plate extends across the first end portion of the tank below a heater tube. The mixture is introduced to a point below one end of the plate, then reverses flow along the heater and over the partition plate until it contacts a vertically extending, transverse corrugated baffle plate. The longitudinal flow of the mixture is reversed several times as it flows over the heater tube and against the crenulated baffle plate. Water separates from the oil, and gas moves to the top of the tank and is removed by a vertical pipe. In the opposite, second end of the tank, a T-shaped partition plate subassembly further separates oil and water, and directs each into a separate removal chamber defined within the tank.

20 Claims, 2 Drawing Sheets

OIL, WATER AND GAS MIXTURE SEPARATOR

FIELD OF THE INVENTION

This invention relates to a separator apparatus in which a mixture containing oil, water and gas typically derived from a producing oil well is processed to separate and individually recover the oil and water and gas.

BRIEF DESCRIPTION OF THE PRIOR ART

A need exists in the production of petroleum to separate mixtures of oil, water and gas into the several components so that each can be recovered in a relatively high state of purity and so that the oil and gas are of enhanced commercial value. A number of types of treating apparatus have been proposed for effecting such separation. Many of these have been patented and all perform with varying degrees of efficiency. A widely used general type of system employs heating and turbulent circulation of the mixture against and through a series of baffles located inside a large tank or similar vessel.

An example of one system of this type is that depicted in U.S. Pat. No. 2,825,422 to Schoenfeld. In the Schoenfeld system a horizontal tank contains a heating tube connected to a gas burner which heats a water and oil emulsion to be separated. The tank is divided internally by vertical baffle plates.

Fryer U.S. Pat. No. 3,318,448 relates to the separation of a mixture of oil, water and gas in a tank which includes heat exchanger tubes.

Lowrie U.S. Pat. No. 4,073,734 discloses a horizontal cylinder containing a series of internal baffles and used for separating a water, oil and gas mixture.

Well fluid mixtures are separated in a settling tank apparatus disclosed in Presley U.S. Pat. No. 4,233,154. The fluids separate by gravity in this tank and gas is vented from over the liquid.

BRIEF DESCRIPTION OF THE PREFERRED INVENTION

This invention provides a highly efficient separator-treater apparatus for rapidly separating an emulsified mixture of oil, water and gas into these three components in an essentially pure form at low cost and with a high degree of efficiency of separation.

Broadly described, the separator apparatus of the invention includes an elongated, preferably generally cylindrical, horizontally extending tank. The mixture to be separated is admitted to the tank through a pipe which extends within the tank to a point beneath a horizontally extending partition plate. This plate projects in a plane which is parallel to, and spaced downwardly from, a horizontally extending diametric plane containing the longitudinal centerline of the tank. The partition plate is positioned within the tank below a horizontally extending U-shaped heater tube which enters and leaves the tank at one end thereof.

The mixture flows longitudinally in the tank under the partition plate until it reaches one end thereof. It then rises into close proximity to the heater tube. Here its direction of flow is reversed, and it then moves through the tank until the mixture strikes a crenulated or corrugated baffle plate which projects vertically in the tank, and from side-to-side thereof. The mixture can pass under and over this corrugated baffle plate, but predominantly is reversed in its flow and flows back across the heater for several passes. Heat and agitation engendered by this reversal of flow enhances separation of a substantial proportion of the water from the oil which, of course, occurs largely by reason of the difference in density of these materials. Gas is knocked out of the mixture, rises to the top of the tank, and is removed from that location through a vertically extending pipe. This pipe discharges the gas through a demister which removes a substantial part of the liquid and moisture content of the ascending gas.

The portion of the oil and water which ultimately flows over the top of, and beneath the bottom of, the corrugated baffle plate toward the opposite end of the tank ultimately moves into contact with a T-shaped partition plate subassembly. This subassembly is located in the opposite end of the tank from the heater tube, and it includes a vertically extending central partition plate which defines on its opposite sides, a water chamber and an oil chamber. The T-shaped partition plate subassembly further includes a vertical, transversely extending separatory plate means which extends normal to the vertically extending central partition plate and functions to accelerate and enhance the separation of the oil and water from each other. The vertical, transversely extending separatory plate means, in association with a separation tube subassembly, functions to effect the final separation of water and oil, so that the oil moves into the described oil chamber on one side of the vertically extending central partition plate, and the water moves into the water chamber on the opposite side thereof. From this location, the water and the oil can be separately and individually removed from the tank as may be desired.

An important object of the present invention is to provide a separatory apparatus for separating a gas laden water and oil emulsion into oil, water and gas components of high purity in a rapid and economical manner.

A further object of the invention is to provide a separator apparatus which functions effectively for separating mixtures of oil, water and gas into the several components thereof without requiring the employment or utilization of any moving parts.

A further object of the invention is to provide an oil, water and gas separating device which is capable of separating most of the gas from this mixture in a relatively moisture-free form at a location where the gas can be quickly and easily recovered and piped to a desired location.

An additional object of this invention is to provide an apparatus which can quickly and very efficiently separate an oil and water emulsion into the components thereof in a way such that each can be selectively drawn off as may be desired in an essentially pure form through access conduits connected into a tank and forming a part of the apparatus.

Additional objects and advantages of the invention will become apparent as the following detailed description of the invention is read in conjunction with the accompanying drawings which illustrate a preferred embodiment of the invention.

GENERAL DESCRIPTION OF THE DRAWINGS

Certain internal parts of the apparatus are shown in elevation.

FIG. 6 is a horizontal sectional view taken along line 6—6 of FIG. 2, and showing certain internal parts of the apparatus in elevation.

DETAILED DESCRIPTION OF A PREFERRED EMBODIMENT OF THE INVENTION

The separator apparatus of the invention includes an elongated, horizontally extending, preferably cylindrical tank 10 into which the mixture to be separated is introduced, and from which the separated components are withdrawn. Other embodiments of the tank 10 may be of polygonal cross-section. In the illustrated embodiment, the generally cylindrical tank 10 includes a central cylindrical section 12 which, in this particular embodiment, has a pair of end closure plates 14 and 16. The end closure plates 14 and 16 which form opposite ends of the tank are dimensioned to be press-fitted within the open ends of the cylindrical section 12, and to close the tank with high strength arcuate end plates. Each of these end closure plates 14 and 16 carries an annular flange (14a and 16a, respectively), which is secured by welding or other suitable means to the internal surface of the cylindrical section 12 into which it is pressed.

Figures 1, 8:
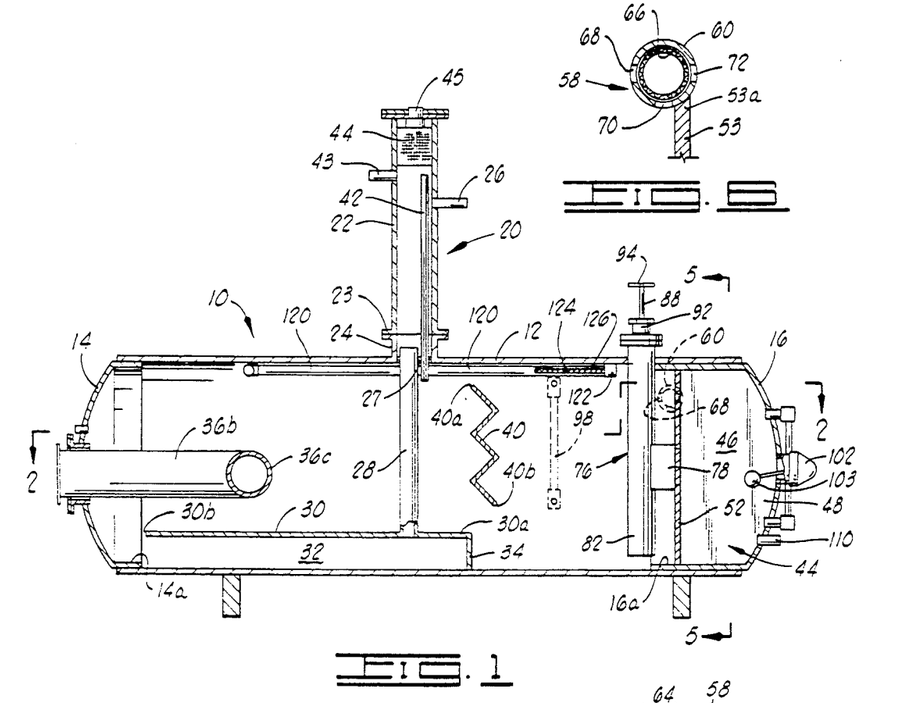
FIG. 1 is a vertical sectional view taken in a vertical plane and extending diametrically through the longitudinal centerline of a tank which constitutes a major portion of the separator apparatus of the invention.
Figure 3:
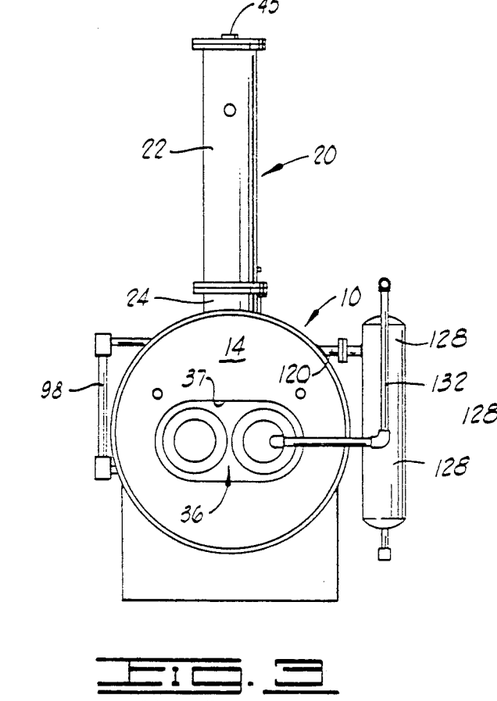
FIG. 3 is an end elevation view of the separator apparatus of the invention as it appears when viewed from one end thereof.
Figure 4:
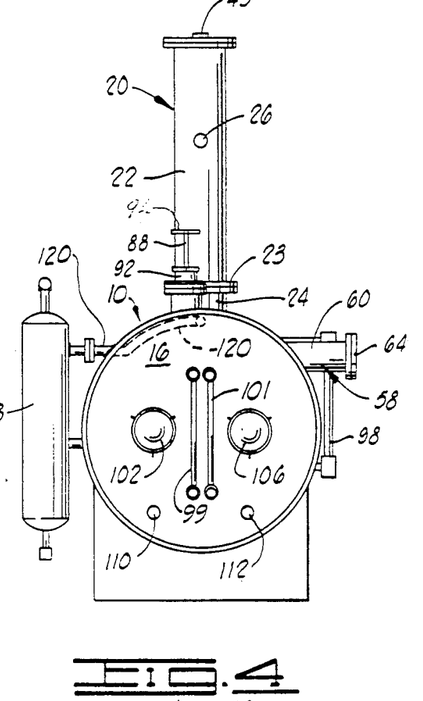
FIG. 4 is a view in elevation of the opposite end of the separator apparatus from that which is illustrated in FIG. 3.

A vertically extending mixture charging pipe subassembly 20 is secured to the top of the tank 10 at about the center of the cylindrical section 12 as shown in FIGS. 1, 3 and 4. The vertically extending mixture charging pipe subassembly 20 includes an external pipe section 22 which has a flanged lower end to permit it to be bolted or otherwise suitably secured to a flanged fitting 24 projecting upwardly from the center of the tank and corresponding in diameter to the diameter of the external pipe section 22. The mixture to be separated is charged to the pipe section 22 through a conduit connected to a laterally projecting fitting 26. The external pipe section 22 communicates through an opening 25 formed in a collar plate 27 secured within the flanged fitting 24 with an internal pipe section 28 which extends vertically within the tank 10. The pipe section 28 carries the mixture to be separated downwardly within the tank from the pipe section 22. The lower end of the pipe section 28 opens through a substantially horizontally extending elongated flow-directing plate 30.

The flow-directing plate 30 has an inner end 30a and an outer or discharge end 30b. The end 30b of the flow-directing plate 30 is relatively near to the end closure plate 14. The inner end 30a of the flow-directing plate 30 is located a little past the center of the tank 10 in the direction of the end closure plate 16. The flow-directing plate 30 extends transversely in a chordal plane of the generally cylindrical tank 10, and has its opposite side edges welded or otherwise suitably secured by a fluid-tight connection to the opposite lateral sides of the cylindrical tank 10. There is thus defined beneath the flow-directing plate 30, a space 32 into which the mixture of gas, water and oil to be separated into its several components is directed from the open end of the internal pipe section 28.

The flow of the mixture beneath the flow-directing plate 30 is mono-directional by reason of a flange 34 which closes one end of the space 32. It projects from the inner edge 30a of the flow-directing plate 30 downwardly to the bottom of the cylindrical tank 10. The bottom edge of the flange 34 is secured by welding or other suitable means to the inner wall of the cylindrical section 12 of the tank 10. The opposite end of the space 32 under the flow-directing plate 30 opens to the interior of the tank, so that the mixture moving in this space can flow upwardly in the tank at this location. The mixture moving upwardly in the tank 10, after passing the end edge 30b of the flow-directing plate 30, comes in contact with a generally U-shaped horizontally extending heater tube subassembly denominated generally by reference numeral 36.

The U-shaped heater tube subassembly 36 includes a pair of opposed, substantially parallel legs 36a and 36b which are joined at their inner ends inside the tank 10 by a web or loop portion 36c. The legs 36a and 36b pass out through a large opening or port 37 in the end closure plate 14, and each of the legs carries a flanged outer end. This permits a suitable burner (not shown) and a suitable flue stack (not shown) to be connected to the U-shaped tube. As hereinafter explained, hydrocarbon gases separated from the mixture within the tank 10 can be used as a fuel for supplying a burner disposed in the inlet opening to the leg 36a of the heater 36. Hot combustion gases can then be delivered to one leg of the tube for circulation within the tube and ultimate venting to the atmosphere or other point of disposition after the hot gases have undergone heat exchange with the mixture to be separated as it circulates within the tank 10. After moving from the space 32 beneath the plate 30, this mixture becomes warmed by contact with the U-shaped heating tube subassembly 36. The direction of flow of the mixture is reversed by the obstruction posed by the end closure plate 14, and it moves from the left toward the right, as the tank 10 is viewed in FIG. 1.

Figure 2:
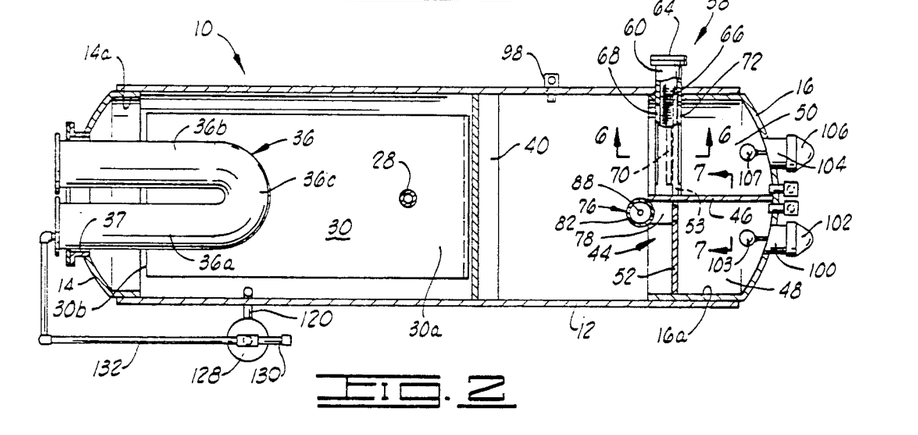
FIG. 2 is a horizontal sectional view taken along line 2—2 on FIG. 1. Again, certain parts of the apparatus are shown in elevation.

The mixture moving longitudinally within the tank 10 in the direction described ultimately contacts a vertical, transversely extending corrugated baffle plate 40 which occupies the position in the tank depicted in FIGS. 1 and 2. The corrugated baffle plate 40 is of zig-zag or crenulated cross-sectional configuration, as shown in FIG. 1. It extends transversely across the tank 10 from one side to the other, as best illustrated in FIG. 2, and has its opposite end edges joined to the opposite lateral sides of the tank 10 by welding or other suitable means. An upper edge 40a of the baffle plate 40 is spaced downwardly from the top of the tank 10 and the lower edge 40b is spaced upwardly from the bottom or lower side of the tank. It is thus possible for a part of the fluid mixture moving longitudinally within the tank 10 to pass over the baffle plate 40. A part of the mixture can also pass beneath the lower edge 40b thereof. A major portion of the fluid mixture moving from the end of the tank 10 closed by the end closure plate 14 toward the end closed by the end plate 16, however, impinges upon the transverse baffle plate 40, and undergoes a reversal of flow. A significant part of the mixture therefore recirculates back in the direction of the U-shaped heater tube 36, so that overall, there tends to be a recirculating thermosyphonic flow in one end portion of the tank 10 which is generally defined as that portion between the baffle plate 40 and the end closure plate 14.

As the mixture within the tank 10 undergoes the described reversal of direction of flow, and at the same time is heated by further contact with the U-shaped heating tube 36, the separation of the components of the fluid mixture is enhanced. At this time, a significant part of the gas content of the mixture is separated and ascends into the top portion of the tank 10. This released gas can then be discharged upwardly through a gas vent pipe 42 which opens through the collar plate 27 into the top of the tank 10 at a location alongside the internal pipe section 28. It will be noted that the open upper end of the gas vent pipe 42 is located above the pipe fitting 26. Gas which is vented upwardly through this pipe therefore does not interfere with the charging of the mixture to be separated to the charging pipe subassembly 20 through the fitting 26. A fitting 43 for connection of a suitable pop-off or pressure relief valve is provided near the upper end of the gas vent pipe 42. A demister screen 44 or suitable moisture separating device is located in the upper end of the pipe section 22, and functions to cause any moisture or liquid droplets entrained in the ascending gas to be "knocked out" or removed. Finally, the relatively dry gas can be discharged at the upper end of the pipe section 22 through a suitable fitting 45 which can be connected to a suitable products sales line (not shown).

The circulating mixture within the tank 10 also begins to separate to some extent into its water and oil components as it is heated and as it impinges against the corrugated transverse baffle plate 40. The baffle plate 40 passes a relatively oil-rich portion of the mixture over its upper edge 40a, and a water rich portion of the mixture beneath its lower edge 40b, and by this mechanism, affords a significant enhancement of the component separatory effect engendered by heating of the mixture, and cyclically circulating it in one end portion of the tank.

Figure 5:
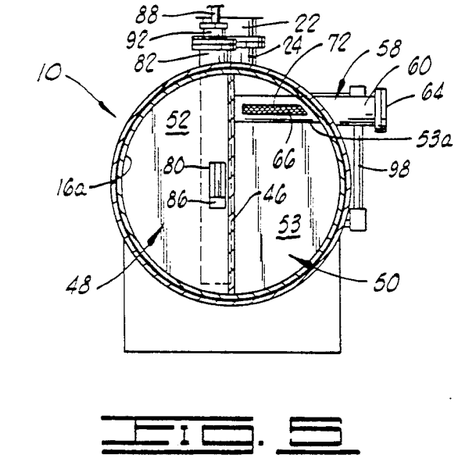
FIG. 5 is a vertical sectional view taken along line 5—5 of FIG. 1.
Figure 7:
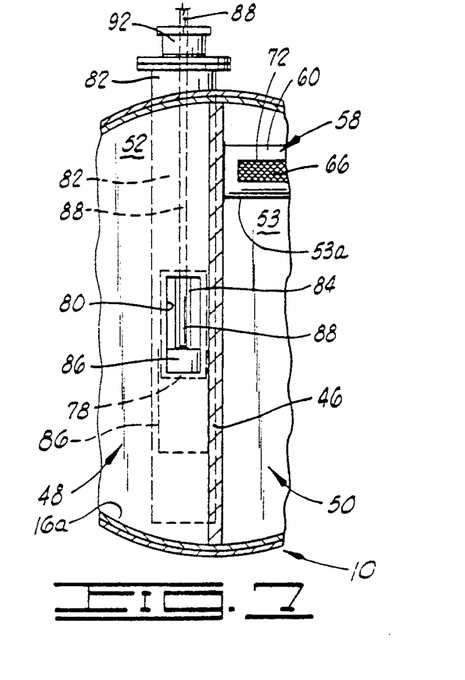
FIG. 7 is a sectional view taken along line 7—7 of FIG. 2.

As a portion of the mixture to be separated moves past the upper and lower edges 40a and 40b of the baffle plate 40, it enters a zone within the tank 10 between this baffle plate and a T-shaped partition plate subassembly, designated generally by reference numeral 44. The T-shaped partition plate subassembly 44 is best illustrated in FIGS. 2, 5 and 7. This subassembly includes a vertical, longitudinally extending partition plate 46 which projects longitudinally inwardly from that end of the tank 10 which is closed by the end closure plate 16. The vertical, longitudinally extending partition plate 46 is illustrated in section in FIGS. 2 and 5, and in elevation in FIG. 1. The partition plate 46 has its upper edge secured to the inwardly extending annular flange 16a forming a part of the closure plate 16 and its lower edge is also secured to this flange on the opposite side of the tank 10. The partition plate 46 at this location thus divides the tank into a water chamber 48 and an oil chamber 50, as best illustrated in FIGS. 2 and 5.

The T-shaped partition plate subassembly 44 also includes a two-part vertical, transversely extending partition plate means which extends across the tank between the lateral sides of the tank. A first part of the transversely extending partition plate means includes a first partition plate 52 having one end edge of semicircular configuration secured by welding or other suitable means to the annular flange 16a forming a part of the closure plate 16, and having its other straight end edge secured to the vertical, longitudinally extending partition plate 46. The first partition plate 52 thus forms a closure for the water chamber 48.

A second partition plate 53 constituting the second portion of the transversely extending partition plate means is disposed in coplanar alignment with the first section thereof, and forms a partial closure for the oil chamber 50. The second partition plate 53 has its upper edge 53a (see FIG. 5) spaced downwardly a short distance from the top of the tank 10, and this upper edge thus forms a weir over which liquid can flow into the oil chamber 50 from the central portion of the tank.

In order to aid in the separation of oil from water, a separatory tube subassembly 58 is secured to the upper edge 53a of the partition plate 53 as shown in FIGS. 1, 2, 4, 5 and 7. The separatory tube subassembly 58 includes an elongated, extended tube 60 which is welded or otherwise suitably secured to the upper edge 53a of the partition plate 53. An open end of this tube 60 is closed by abutment against the side of the partition plate 46 as shown in FIGS. 5 and 7. The other end portion projects through the wall of the tank 10 to the outer side thereof and is closed by a removable cap 64. An in-line cylindrical tubular screen filter tube 66 is slid coaxially into the inside of the slotted tube 60, and occupies a major portion of the length of this tube. The in-line screen filter tube 66 functions conjunctively with slots 68, 70 and 72 (see FIGS. 1, 5 and 6) formed in the slotted tube 60 to enhance separation of water from oil as the mixture reaches the transversely extending partition plates 52 and 53. As the mixture, here being here being constituted predominantly of oil, passes into the tube 60 through the slot 68 and contacts the screen filter tube 66, any water which is admixed with the oil as an emulsion is knocked out of the oil by the screen filter tube and passes downwardly through the slot 70 formed in the bottom of the slotted tube as shown in FIG. 6. The water, thus coalesced into droplets, gravitates downward through the oil layer alongside the inwardly facing side of the separatory partition plate 53 and reaches the water rich layer or zone at the bottom of the tank. Oil of enhanced purity (by reason of such water separation) passes through the slot 70 into the oil chamber 50 located on the opposite side of the partition plate 53.

In the use of the separatory tube subassembly 58, the screen filter tube 66 can be changed out and cleaned whenever desired by removal of the removable cap 64 and subsequently sliding the screen filter tube out of the slotted tube 60.

A phase interface adjusting subassembly is provided for adjusting the horizontal level of the interface between the predominantly oil and water layers, or, where, as is often the case, there is not a well defined interface therebetween, the relative volumetric amount of the predominantly oil phase and the predominantly water phase within the tank. The separation into discernible oil-rich and water-rich phases occurs primarily in the space between the corrugated baffle plate 40 and the T-shaped partition plate subassembly 44. The described interface adjusting subassembly is designated generally by reference numerals 76, and is best illustrated in FIGS. 1, 5 and 7 of the drawings. The interface adjusting subassembly 76 is employed, as indicated, to cause the location of the oil and water stratification within the tank 10 to be at a selected vertical location in a way and for a purpose hereinafter described.

The interface adjusting subassembly 76 includes a rigid metallic box 78 which is of generally right parallelepiped configuration, and which is open at two opposite sides thereof, and which serves as a water passageway to the water chamber 48. One of the open sides of the rigid metallic box 78 seals a correspondingly sized opening 80 in the first partition plate 52. This opening, as indicated, opens into the water chamber 48. At the open opposite sides of the box 78, the box is sealed against an elongated cylindrical adjusting tube 82 which extends from a location just above the bottom of the tank 10 upwardly through the top of the tank as shown in FIGS. 1, 5 and 7. The adjusting tube 82 is open at its lower end to permit the entry of water into the central longitudinal bore of the tube, and the tube defines an elongated slot 84 communicating with the interior of the box 78 at the open side thereof which is adjacent the tube. This slot 84 can be seen in FIG. 7. Typically, it is from about twelve to about sixteen inches in length.

A tubular piston valve 86 is slidably mounted in the tube 82 and is reciprocated therein in a controlled fashion by means of an elongated control rod 88. The control rod 88 extends upwardly through a packing seal (not visible) maintained by a packing nut 92. A handle 94 is secured to the upper end of the control rod 88 at a location outside the tank 10. The position of the tubular piston valve 86 in the tube 82 is such that the piston valve will move across the slot 84 to open or close this slot to a selectively varied extent. The piston valve 86 can be used to entirely close the slot 84 in some instances. As will be hereinafter explained, moving the piston valve 86 down within the adjusting tube 82, causes the interface between the oil and water to be moved downwardly, or stated more definitively, permits the volumetric amount of the oil-rich layer relative to the volume of the water-rich layer to be varied.

Access to the water chamber 48 is had via an access port 100 which is covered with a suitable removable cap 102. An actuating float 103 is provided to control the opening and closing of a float-operated dump valve (not shown), and this controls the discharge of water from the water chamber 48. Similarly, an access port 104 communicates with the oil chamber 50 and is covered by a removable cap 106. A float-operated dump valve (not visible) is opened and closed in correspondence with the movement of a float 107 to control the discharge of oil from the oil chamber 50. Water is discharged from the water chamber via a suitable discharge conduit 110, and its flow from the chamber is controlled by the trunnion-type float operated dump valve (not shown) which is opened and closed by movement of the float 103. This same valve type action is used to control the flow of oil from the oil chamber via an oil discharge conduit 112. Sight glasses 98, 99 and 101 are affixed to the side and end of the tank 10 at locations such that they extend across the central horizontal plane thereof and function to visually apprise an operator of the relative location and status of the oil rich phase and the water rich phase within the tank. These sight glasses provide vantage points for visually ascertaining the oil/water interface at any time.

An internal fuel gas line 120 is included in the system and is illustrated in FIGS. 1, 2 and 4. The fuel gas line 120 terminates in a capped intake end 122 adjacent which are a pair of slots 124 defined in the sides of the line. A demister screen 126 is located within the line adjacent the slots 124 and functions to remove moisture from hot hydrocarbon gases separated from the mixture within the tank 10 and entering the internal fuel gas line 120. The separated gas drawn from this location in the tank 10 is already relatively dry when entering the tube via the slots, but the demister screen aids in the final drying of the gas.

The fuel gas line 120 extends over a major portion of the length of the tank 10 so that the separated gas moving therethrough is heated. The heated hydrocarbon gas is then carried by the fuel gas line 120 through the tank wall to a moisture separator 128 located outside the tank (see FIGS. 2 and 3). A part of the hot gas then is teed into a line 130 which extends to the well head, and the remainder passes through a line 132 to a burner (not shown) located in the entrance to the U-shaped heater tube 36. Here the gas is ignited and burned to provide the hot gases of combustion which pass through the heater tube within the tank.

OPERATION

In using the separator apparatus of the invention, a mixture of oil and water, normally with some gas entrained, as produced at a wellhead, is passed into the apparatus via the vertically extending discharge pipe subassembly 20. Here, the mixture is passed from a suitable transfer conduit or pipe (not shown) into the fitting 26, and then from this fitting it passes downwardly through the pipe section 22 and then through pipe section 28.

The mixture moves from the pipe section 28 to a location beneath the flow directing plate 30 within the space 32. Here, the hydrostatic head of the incoming mixture, and the function provided by the flange 34 cause the mixture to move toward the end of the tank which is closed by the closure plate 14. Ultimately, the mixture of water and oil and gas moves out from under the flow directing plate 30, and ascends within the tank 10 until it contacts the heater tube subassembly 36. It is also caused to rise and to move toward the right, as the tank is viewed in FIG. 1, by its contact with the end closure plate 14.

At this point, the mixture commences to be heated and its direction of flow is reversed so that it commences to flow across the top of the flow directing plate 30, and concurrently ascends within the tank 10. Eventually, after movement to the right, and, incidentally, providing some small amount of heat exchange with the incoming mixture flowing downwardly in the pipe section 28, the heated mixture impacts upon the corrugated baffle plate 40. Upon contacting the baffle plate 40, some of the mixture can flow over the upper edge 40a and some of the mixture can flow under the lower edge 40b of the baffle plate. A major portion of the mixture, however, is reversed in its flow after impacting the central portion of the corrugated baffle plate 40, and flows up over, and in the opposite direction from, the previously described initial flow from the heater assembly 36 toward the baffle plate, so that there is established a circuitous and turbulent flow of the mixture in the location between the baffle plate 40 and the end closure plate 14.

After the mixture has undergone this thermosyphonic-type of cyclic circulation several times, a large amount of the circulating mixture has passed over the upper edge and below the lower edge of the corrugated baffle plate 40. The locations of the liquid bypass routes allowing the mixture to move past the baffle plate, in being located relatively high and relatively low in the tank 10, favor separation of the mixture into the less dense and more dense components. Thus, that part of the mixture which moves across and bypasses the upper edge 40a of the baffle plate 40 is an oil-rich fraction, while that which passes beneath the baffle plate at its lower edge 40b is a water-rich fraction. This mechanical separatory effect, coupled with the turbulence and heating of the mixture, enhances the rate of separation of the oil and water, and also causes the entrained gas to separate more quickly and to move to the top of the tank. This results in an accumulation of free gas in the upper portion of the tank, and a significant degree of separation of the oil and water mixture in that portion of the tank which lies between the baffle plate 40 and the T-shaped partition plate subassembly 44.

Before proceeding with the description of the completion of the separation of the oil and water components of the mixture from each other, the handling of the gas separated will be discussed. The gas component of the mixture is, of course, a mixture of hydrocarbon gases where a producing oil well is the source of the treated fluid. This gas is relatively light and accumulates in the upper portion of the tank 10 as it is separated. For purposes of removing and selling the hydrocarbon gas, which will usually be predominantly methane, the pipe 42 carries the gas upwardly and enables it to pass through the demister screen 44 and into a sales line or conduit which carries the gas to a point of commercial disposition.

Another portion of the hydrocarbon gas accumulated in the top of the tank 10 passes into the gas line 120. Some of the residual moisture in the gas is knocked out by the demister screen 126 located opposite the slots 124 in the fuel gas line. The gas then passes on through the fuel gas line 120, picking up heat from the heater tube assembly 36 and then passes through the wall of the tank and into the separator 128. A portion of the gas is passed through a line 130 to the wellhead (not shown) where it is used in the operation of the well, and the remainder of the heated, relatively dry gas is passed through line 132 to a burner located in the entrance to the U-shaped heater tube 36. Here the gas is ignited and burned to provide the heat necessary to heat the mixture to be separated as the hot gases of combustion pass through the U-shaped heater tube.

The water and oil mixture located in the zone between the baffle plate 40 and the T-shaped partition plate subassembly 44 tends to stand more quiescently, and as a result of the heating of the mixture and the separatory effect of the baffle plate 40, the liquid located in the upper portion of the tank in this zone is predominantly oil, and the liquid located adjacent the bottom of the tank is predominantly water.

Separation of the oil and water continues in the mixture located in the space between the baffle plate 40 and the T-shaped partition plate subassembly 44. Final separation is accomplished by the action of the partition plate subassembly 44. The oil-rich layer, being located nearer to the top of the tank, is caused to move into the separatory tube subassembly 58, and more specifically, the slotted tube 60, by entrance through the slot 68 which faces toward the corrugated baffle plate 40 (see FIG. 6). The oil, carrying some small amount of entrained water, upon entering the slotted tube 60, contacts the in-line screen filter tube 66.

The mechanical separatory effect of this screen filter tube 66 causes the water to be knocked out of the oil and to coalesce in droplets which then gravitate out of the tube 60 through the slot 70 formed at the bottom side thereof. It will be noted, in referring to FIG. 6 that this slot 70 is on the upstream side of the partition plate 53, and therefore the coalesced droplets of water remain on the opposite side of this plate from the oil accumulated in the oil chamber 50. The water droplets gravitate downwardly through the oil and into the water layer located in the bottom portion of the tank. It may be commented at this point that the separatory effect of the in-line screen filter tube 66 can be enhanced by making this tube of a hydrophilic material, as the water tends to adhere to such material, and thus the coalescence of water particles is enhanced.

The oil, now being substantially further purified after passage through the separatory tube subassembly 58 flows downwardly into the body of oil in the oil chamber 50 located on one side of the partition plate 53. Oil thus accumulates in the oil chamber 50 preparatory to removal therefrom to a product line via the discharge tube or pipe 112. The removal of oil from the oil chamber is controlled by a float-controlled valve which is responsive to the level of the surface of the oil in the oil chamber.

The water in the mixture eventually accumulates in a state of relatively high purity in the lower portion of the tank 10 between the baffle plate 40 and the T-shaped partition plate subassembly 44. The relatively pure water enters the open lower end of the adjusting tube 82 and passes upwardly through the axial bore therein. Water from the adjusting tube is enabled to pass through the slot 80 from the box 78 into the water chamber 48 which is located between the partition plate 52 and the end closure plate 16 and to the left of the partition plate 46 as it is viewed in FIG. 5. Relatively pure (free of oil and gas) water thus builds up in the water chamber 48 to a certain level which is determined by the liquid head and depth of the total body of liquid and its density within the space between the baffle plate 40 and the T-shaped partition plate subassembly 44. The relatively pure water can be removed from the water chamber 48 by the water discharge pipe 110 to a point of disposition. Time and rate of removal can conveniently be controlled by a float responsive valve mechanism.

As the well flows over a period of time, the well conditions change so that the relative volumetric amounts of oil and water and gas contained within the mixture change, and the density of the oil and water also will often change. Thus, when there is a substantial back flow of fracturing water into the well bore, the density of the water being produced in the mixture will differ from the density of the water subsequently produced. By the use of the adjusting tube 82, forming a part of the interface adjusting subassembly 76, the amount of water which is retained in oil transferred from the separator apparatus of the invention to stock tanks can be reduced—that is, the stock tank-stored oil is of higher purity and has less water contamination.

When the control rod 88 and the piston valve 86 are pushed downwardly, the thickness of the zone in the vessel occupied by oil-rich liquid increases, and the thickness of the underlying water zone decreases, and there is more emulsion in the vessel at that time. However, the thicker oil zone allows more time (and distance of migration) for water separation. Conversely, moving the water leg up by elevating the piston valve 86 within the adjusting tube 82 tends to alleviate the propensity to have traces of oil appearing in the water chamber, and enhances the purity of the water accumulated in the water chamber. Raising the piston valve results in a thicker water layer or a greater total volume of water in the tank.

When water appears in the oil in the oil chamber 50, or in the oil produced from that chamber to a stock tank, this indicates to the operator that it is desirable to lower the piston valve within the adjusting tube. The result will be that the total volume of water is reduced, and the level of water in the tank is lowered, and a more water-free oil is then separated.

By completely closing the slot 84 in the adjusting tube 82, the flow of water into the water chamber 48 is completely stopped and this allows the water layer to build up in the bottom of the tank 10 between the baffle plate 40 and the T-shaped partition plate subassembly 44. This is desirable in cases where the well providing the liquid to be treated in the separator is flowing almost pure oil with very little water. In order for the separator to work properly, a water layer needs to be developed in the bottom of the tank 10, and, as indicated this is accomplished by completely sealing off the slot 84 by means of the piston valve 86.

Although a preferred embodiment of the invention has been herein illustrated and described in order to allow its principles to be understood, it will be perceived that various changes and innovations can be made in the illustrated structure and described functions without total departure from these basic principles. Changes and innovations of this type are therefore deemed to be circumscribed by the spirit and scope of the invention, except as the same may be necessarily limited by the appended claims, or reasonable equivalents thereof.

What is claimed is:

1. An apparatus for separating oil and water and gas individually from a mixture containing them comprising:

an elongated, generally horizontally extending tank having an upper side, a lower side, a first end, a second end, and having generally opposite lateral sides;

a heater projecting into the tank from the first end thereof, and extending substantially parallel to the longitudinal axis thereof at a location spaced upwardly from the lower side thereof;

a substantially horizontally extending, elongated flow directing plate extending across the tank between the generally opposite lateral sides thereof at a location between the lower side thereof and said heater, and defining a fluid flow path above the lower side of the tank and beneath the flow directing plate over which fluid flow path fluid is directed toward said first end of the tank, said flow directing plate having an inner edge and a discharge edge which is positioned relatively closer to said first end of said tank than is said inner edge;

a mixture charging pipe subassembly for charging a mixture comprising water, oil and gas from the exterior of said tank to a location interiorally thereof which is between said flow directing plate and the lower side of said tank;

a crenulated vertically extending corrugated baffle plate extending across said tank between the opposite lateral sides thereof at a location between the inner edge of said flow directing plate and said second end of said tank, said generally vertically extending baffle plate having an upper edge spaced downwardly from the upper side of said tank, and having a lower edge spaced upwardly from the lower side of said tank;

means for discharging gas from a location inside said tank which is adjacent the upper side thereof to the exterior of the tank;

a generally T-shaped partitioning plate subassembly located in the end portion of said tank adjacent said second end, and positioned between said corrugated baffle plate and said second end, and spaced from said flow directing plate toward said second end of said tank, said T-shaped partitioning plate subassembly comprising:

a vertical, longitudinally extending partition plate positioned between, and spaced from, said opposite lateral sides, and projecting inwardly into said tank from said second end thereof, and extending from the upper side of said tank to the lower side thereof to partition said tank into a water chamber along one lateral side thereof and an oil chamber along the other lateral side thereof; and vertical, transversely extending partition plate means crossing the tank and having opposite end edges joined to the opposite lateral sides of the tank, said transversely extending partition plate means having a central portion joined to said longitudinally extending partition plate and at least partially defining and bounding said oil chamber, and also bounding said water chamber;

first passage means for passing water across said transversely extending partition plate means into said water chamber and second passage means for passing oil across said transversely extending partition plate means into said oil chamber; and discharge pipe means extending out of said tank from a location adjacent the second end thereof, and including:

a water pipe for discharging water from said water chamber; and an oil pipe for discharging oil from said oil chamber.

2. An apparatus for separating oil, water and gas as defined in claim 1 wherein said vertical transversely extending partition plate means includes:

a first transverse plate extending across and closing said water chamber, said first section extending from the upper side of said tank to the lower side of said tank and from one of said lateral sides of said tank to said vertical, longitudinally extending partition plate;

a second transverse plate in coplanar alignment with said first transverse plate and extending substantially perpendicularly from said vertical, longitudinally extending partition plate across said oil chamber to one of said lateral sides of said tank, said second section partition having a lower edge joined to the lower side of said tank, and where said second passage means comprises an upper edge spaced downwardly from the upper side of said tank so that said second section forms a weir.

3. Apparatus for separating oil, water and gas as defined in claim 2 and wherein said second passage means further comprises a horizontally extending elongated separatory pipe secured to said upper edge of said second plate, said separatory pipe having a longitudinal axis aligned with, or extending parallel to, the plane of said second plate, and said separatory pipe including a water opening along the lower side thereof for allowing water to be discharged from the lower side of the separatory pipe on the opposite side of said second plate from said oil chamber, and further including an oil opening in one side thereof for discharging oil from the interior of the separatory pipe into said oil chamber, and a mixture opening in the opposite side thereof from said oil opening for admitting a mixture comprising oil and water to the interior of said separatory pipe.

4. Apparatus as defined in claim 3 and further including a cylindrical elongated separatory screen positioned concentrically and removably within said separatory pipe and over said openings.

5. Apparatus for separating oil, water and gas as defined in claim 2 wherein said mixture charging pipe subassembly comprises:
   a vertically extending pipe having an upper end and projecting through the upper side of said tank and extending substantially normal to, and having a lower end opening through, said horizontally extending flow directing plate at a location relatively near to the inner edge of said horizontally extending flow directing plate, which is the edge thereof farthest from the first end of said tank;
   a demister device mounted in the upper end portion of said vertically extending pipe for removing moisture from gas discharged upwardly from said tank; and
   a fitting for introducing a mixture comprising oil, water and gas to said vertically extending pipe at a location outside said tank and between said tank and said demister device; and
   wherein said means for discharging gas from said tank comprises a gas vent pipe projecting up into said vertically extending pipe to a location between said tank and said demister device, and communicating with the interior of said tank for receiving gas therefrom.

6. Apparatus for separating oil, water and gas as defined in claim 2 wherein said heater is a substantially horizontally extending U-shaped tube having two legs opening through said first end of said tank, and having an interconnecting web portion interconnecting said legs at a location inside said tank for circulation of a heat exchange medium over said horizontally extending partition plate at a location spaced upwardly above said horizontally extending flow directing plate.

7. Apparatus for separating oil, water and gas as defined in claim 6 wherein said mixture charging pipe comprises:
   a vertically extending pipe having an upper end and projecting through the upper side of said tank and extending substantially normal to, and having a lower end opening through, said horizontally extending flow directing plate at a location relatively near to the inner edge of said horizontally extending flow directing plate which is farthest from the first end of said tank;
   a demister device mounted in the upper end portion of said vertically extending pipe for removing moisture from gas vented upwardly therethrough; and
   a fitting for introducing a mixture comprising oil, water and gas to said vertically extending pipe at a location outside said tank and between said tank and said demister device; and
   wherein said means for venting gas comprises a gas vent pipe projecting up into said vertically extending pipe to a location between said tank and said demister device, and communicating with the interior of said tank for receiving gas therefrom.

8. Apparatus for separating oil, water and gas as defined in claim 1 wherein said mixture charging pipe subassembly comprises:
   a vertically extending pipe having an upper end and projecting through the upper side of said tank and extending substantially normal to, and having a lower end opening through, said horizontally extending flow directing plate at a location relatively near to the inner edge of said horizontally extending flow directing plate, which is the edge thereof farthest from the first end of said tank;
   a demister device mounted in the upper end portion of said vertically extending pipe for removing moisture from gas discharged upwardly from said tank; and
   a fitting for introducing a mixture comprising oil, water and gas to said vertically extending pipe at a location outside said tank and between said tank and said demister device; and
   wherein said means for discharging gas from said tank comprises a gas vent pipe projecting up into said vertically extending pipe to a location between said tank and said demister device, and communicating with the interior of said tank for receiving gas therefrom.

9. Apparatus for separating oil, water and gas as defined in claim 1 wherein said heater is a substantially horizontally extending U-shaped tube having two legs opening through said first end of said tank, and having an interconnecting web portion interconnecting said legs inside said tank and spaced from said first end thereof for circulation of a heat exchange medium over said horizontally extending flow directing plate at a location spaced upwardly above said horizontally extending flow directing plate.

10. An apparatus for separating oil and water and gas individually from a mixture containing them as defined in claim 1 and wherein said first passage means comprises means for adjusting the relative volumetric relationship of the oil-rich and water-rich phases within the tank at a location between the corrugated baffle plate and the generally T-shaped partitioning plate subassembly whereby oil which is relatively more water-free can be withdrawn from said oil chamber.

11. An apparatus for separating oil and water and gas individually from a mixture containing them as defined in claim 10 wherein said means for adjusting the relative volumetric relationship comprises:
   a vertically extending, cylindrical adjusting tube having an open lower end adjacent the bottom of the tank, and having an axial slot in one side thereof, said cylindrical adjusting tube being located between said corrugated baffle plate and said generally T-shaped partitioning plate subassembly;
   a tubular piston valve slidably and reciprocably mounted within said adjusting tube at a location facilitating selective and adjustable covering of all or a selected part of said axial slot by movement of said piston valve across said slot, said piston valve having an axial bore therethrough through which water can move from the open lower end of said adjusting tube upwardly through said tubular piston valve;
   a control rod extending from said piston valve axially upwardly in said adjusting tube for reciprocating said piston valve relative to said slot; and liquid passageway means communicating said slot with an opening through said first transverse plate into said water chamber.

12. An apparatus for separating oil and water and gas individually from a mixture containing them as defined in claim 11 wherein said adjusting tube passes upwardly through the upper side of said tank, and has an upper end located outside said tank from which said control rod projects;

and wherein said adjusting means further includes:
a handle at the upper end of said control rod; and
packing means closing the upper end of said adjusting tube and packingly sealing around said control rod.

13. An apparatus for separating oil and water and gas individually from a mixture containing them as defined in claim 1 and further including means for conveying separated gas from the upper portion of the interior of said tank to said heater for combustion at the location of said heater to supply hot combustion gases thereto.

14. An apparatus for separating oil and water and gas individually from a mixture containing them as defined in claim 13 wherein said means for conveying separated gas comprises a fuel gas line extending along the upper side of said tank on the inside thereof, and having an inlet thereinto for receiving gas separated from said mixture, and said fuel gas line projecting through said tank to the outer side thereof;

a moisture scrubber unit located outside said tank connected to said fuel gas line for receiving fuel gas therefrom and separating moisture from the received fuel gas; and a gas burner line extending from said moisture scrubber unit to said heater to facilitate providing heat to said heater.

15. An apparatus for separating oil and water and gas individually from a mixture containing them as defined in claim 14 and wherein said first passage means comprises means for adjusting the relative volumetric relationship of the oil-rich and water-rich phases within the tank at a location between the corrugated baffle plate and the generally T-shaped partitioning plate subassembly whereby oil which is relatively more water-free can be withdrawn from said oil chamber.

16. An apparatus for separating oil and water and gas individually from a mixture containing them as defined in claim 15 wherein said means for adjusting the relative volumetric relationship comprises:

a vertically extending, cylindrical adjusting tube having an open lower end adjacent the bottom of the tank, and having an axial slot in one side thereof, said cylindrical adjusting tube being located between said corrugated baffle plate and said generally T-shaped partitioning plate subassembly;

a tubular piston valve slidably and reciprocably mounted within said adjusting tube at a location facilitating selective and adjustable covering of all or a selected part of said axial slot by movement of said piston valve across said slot, said piston valve having an axial bore therethrough through which water can move from the open lower end of said adjusting tube upwardly through said tubular piston valve;

a control rod extending from said piston valve axially upwardly in said adjusting tube for reciprocating said piston valve relative to said slot; and liquid passageway means communicating said slot with an opening through said first transverse plate into said water chamber.

17. An apparatus for separating oil and water and gas individually from a mixture containing them as defined in claim 13 wherein said vertical, transversely extending partition plate means includes:

a first transverse plate extending across and closing said water chamber, said first section extending from the upper side of said tank to the lower side of said tank and from one of said lateral sides of said tank to said vertical, longitudinally extending partition plate;

a second transverse plate in coplanar alignment with said first transverse plate and extending substantially perpendicularly from said vertical, longitudinally extending partition plate across said oil chamber to one of said lateral sides of said tank, said second section partition having a lower edge joined to the lower side of said tank, and wherein said second passage means comprises an upper edge spaced downwardly from the upper side of said tank so that said second section forms a weir.

18. An apparatus for separating oil and water and gas individually from a mixture containing them as defined in claim 17 and wherein said second passage means comprises a horizontally extending separatory pipe secured to said upper edge of said second plate, said separatory pipe having a longitudinal axis aligned with, or extending parallel to, the plane of said second plate, and said separatory pipe including a water opening along the lower side thereof for allowing water to be discharged from the lower side of the separatory pipe on the opposite side of said second plate from said oil chamber, and further including an oil opening in one side thereof for discharging oil from the interior of the separatory pipe into said oil chamber, and a mixture opening in the opposite side thereof from said oil opening for admitting a mixture comprising oil and water to the interior of said separatory pipe.

19. An apparatus for separating oil and water and gas individually from a mixture containing them as defined in claim 18 and further including a cylindrical elongated separatory screen positioned concentrically and removably within said separatory pipe and over said openings.

20. Apparatus for adjusting the vertical location of the phase boundary zone between two immiscible liquids of differing density comprising:

a first compartment having the two liquids contained therein with the less dense liquid concentrated in an upper zone adjacent the upper surface of the liquids, and the more dense liquid concentrated in a lower zone located vertically lower in the first compartment than the upper zone;

a second compartment having a body of the more dense liquid therein, said second compartment having a boundary partition in common with the first compartment and separating the first compartment from the second compartment;

a vertically extending, cylindrical adjusting tube mounted in said first compartment and having an open lower end opening in the more dense liquid in said lower zone, said vertically extending adjusting tube having an axially extending slot through the side wall thereof and facing said boundary partition plate;

a tubular piston valve slidably and reciprocably mounted within said adjusting tube at a location facilitating selective covering of all or a selected part of said axial slot by movement of said piston valve across said slot, said piston valve having an axial bore extending centrally therethrough through which water can move from the open lower end of said adjusting tube upwardly through said tubular piston valve;

liquid passageway means communicating said slot with an opening through said boundary partition into said second compartment;

a control rod connected to said tubular piston valve and extending upwardly therefrom and passing out of the upper end of said vertically extending adjusting tube;

packing means sealingly surrounding said control rod and connected to the upper end portion of said adjusting tube; and handle means secured to the upper end of said control rod and facilitating reciprocation of said control rod within said adjusting tube and through said packing means.

* * * * *

UNITED STATES PATENT AND TRADEMARK OFFICE
CERTIFICATE OF CORRECTION

PATENT NO.   : 5,132,011
DATED        : July 21, 1992
INVENTOR(S)  : John W. Ferris It is certified that error appears in the above-indentified patent and that said Letters Patent is hereby corrected as shown below:

Column 5, line 47, after "FIGS." and before "2", insert -- 1, --.

Signed and Sealed this

Thirty-first Day of August, 1993

*Attest:*

BRUCE LEHMAN

*Attesting Officer*  *Commissioner of Patents and Trademarks*